(12) United States Patent
Koo

(10) Patent No.: US 7,818,134 B2
(45) Date of Patent: Oct. 19, 2010

(54) METHOD AND APPARATUS FOR DETECTING FORWARD/REVERSE SPEEDS OF CONTINUOUSLY VARIABLE TRANSMISSION FOR VEHICLES

(75) Inventor: Bonwoo Koo, Seoul (KR)

(73) Assignee: Hyundai Motor Company, Seoul (KR)

( * ) Notice: Subject to any disclaimer, the term of this patent is extended or adjusted under 35 U.S.C. 154(b) by 860 days.

(21) Appl. No.: 11/606,573

(22) Filed: Nov. 30, 2006

(65) Prior Publication Data

US 2008/0133158 A1  Jun. 5, 2008

(30) Foreign Application Priority Data

Nov. 6, 2006  (KR)  .................. 10-2006-0109093

(51) Int. Cl.
*B60K 6/543* (2007.10)
*G06F 17/00* (2006.01)

(52) U.S. Cl. .................. 702/71; 702/78; 702/142; 702/145; 477/37

(58) Field of Classification Search .................. 702/71, 702/78, 79, 113, 114, 142, 145
See application file for complete search history.

(56) References Cited

U.S. PATENT DOCUMENTS

| | | | |
|---|---|---|---|
| 4,515,041 A * | 5/1985 | Frank et al. .................. 477/43 |
| 4,648,040 A * | 3/1987 | Cornell et al. ................. 701/52 |
| 5,062,050 A * | 10/1991 | Petzold et al. ................. 701/68 |
| 5,285,389 A * | 2/1994 | Taylor .......................... 701/51 |
| 5,846,157 A * | 12/1998 | Reinke et al. ................... 477/48 |
| 6,569,052 B2 * | 5/2003 | Sakai et al. ................... 475/214 |
| 7,116,101 B1 * | 10/2006 | Bear et al. .................... 324/251 |
| 2003/0105572 A1 * | 6/2003 | Joe et al. ........................ 701/51 |
| 2004/0155649 A1 * | 8/2004 | Kloos et al. .................. 324/227 |

* cited by examiner

*Primary Examiner*—Hal D Wachsman
(74) *Attorney, Agent, or Firm*—Morgan, Lewis & Bockius LLP

(57) ABSTRACT

A method and apparatus for detecting forward/reverse speeds of a continuously variable transmission for vehicles determines whether a vehicle is in a forward speed state or in a reverse speed state by using one speed detector having two sensors. The method for detecting forward/reverse speeds of the continuously variable transmission for vehicles includes detecting first and second rotational speeds of an output shaft modulating the first and second rotational speeds of the output shaft into a pulse width modulation signal, comparing the pulse width of the pulse width modulation signal with predetermined values, and determining whether a vehicle is in a forward speed state or in a reverse speed state.

7 Claims, 3 Drawing Sheets

METHOD AND APPARATUS FOR DETECTING FORWARD/REVERSE SPEEDS OF CONTINUOUSLY VARIABLE TRANSMISSION FOR VEHICLES

CROSS-REFERENCE TO RELATED APPLICATION

This application claims priority to and the benefit of Korean Patent Application No. 10-2006-0109093 filed in the Korean Intellectual Property Office on Nov. 6, 2006, the entire contents of which are incorporated herein by reference.

BACKGROUND OF THE INVENTION (a) Field of the Invention

The present invention relates to a method and apparatus for detecting forward/reverse speeds in a continuously variable transmission, and more particularly, to such a method that determines whether a vehicle is in a forward speed state or in a reverse speed state using a speed detector.

(b) Description of the Related Art

Generally, speed ratios of an automatic transmission or a manual transmission are fixed to constant values, and speed ratios are controlled according to a driving condition. However, a continuously variable transmission (CVT) enables speed ratios to be continuously changed within a predetermined range. Ride comfort and acceleration performance are excellent and fuel consumption is low according to a CVT since shifting is achieved only by operating an acceleration pedal. In addition, a CVT may reduce production cost since a CVT has fewer components, compared with an automatic transmission.

When a vehicle provided with a CVT starts moving uphill, the vehicle moves backward slightly. If a transmission control unit does not detect a backward movement of the vehicle when starting and control a start-up of the vehicle, shift shock may occur. Therefore, a transmission control unit must determine whether a vehicle with a CVT is in a forward speed state or in a reverse speed state and control a start-up of the vehicle in accordance with the moving direction of the vehicle in order to reduce shift shock of the vehicle in a case that the vehicle starts moving uphill.

A conventional CVT uses two speed detectors and therefore, production cost can be high. In addition, the structure of the transmission may be complex since a transmission control unit (TCU) receives signals from two speed detectors and controls the transmission by executing a predetermined program. In addition, it is hard to select positions where the two speed detectors may be mounted, and accordingly, the transmission may be large so as to mount the two speed detectors.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a method for detecting forward/reverse speeds of a continuously variable transmission for vehicles having advantages of determining whether a vehicle is in a forward speed state or in a reverse speed state by using one speed detector.

An exemplary method for detecting forward/reverse speeds of a continuously variable transmission for vehicles according to an embodiment of the present invention may include: detecting first and second rotational speeds of an output shaft; modulating the first and second rotational speeds of the output shaft into a pulse width modulation signal; comparing the pulse width of the pulse width modulation signal with predetermined values; and determining whether a vehicle is in a forward speed state or in a reverse speed state.

The vehicle may be determined to be in the reverse speed state when the pulse width is larger than or equal to a first predetermined value and is smaller than or equal to a second predetermined value.

The vehicle may be determined to be in the forward speed state when the pulse width is larger than or equal to a third predetermined value and is smaller than or equal to a fourth predetermined value.

A malfunction code may be generated when the pulse width is smaller than the first predetermined value, the pulse width is larger than the second predetermined value and is smaller than the third predetermined value, or the pulse width is larger than the fourth predetermined value.

In an alternative embodiment, a system for detecting forward/reverse speeds in a continuously variable transmission, comprises a speed detector including two sensors, each sensor being spaced from a speed detector centerline by a predetermined distance wherein the predetermined distances are related based on a speed detection algorithm. The sensors may be Hall sensors. Such an embodiment may further comprise a transmission control unit communicating with the speed detector. The transmission control unit may include a processor programmed for comparing speed signals from the two sensors to determine a forward or reverse speed state.

A transmission control unit may further include a memory containing a program for execution by the processor. The program may comprise steps of detecting first and second rotational speeds of an output shaft, modulating the first and second rotational speeds of the output shaft into a pulse width modulation signal, comparing the pulse width of the pulse width modulation signal with predetermined values, and determining whether a vehicle is in a forward speed state or in a reverse speed state based on a result of such comparing.

Further alternative embodiments may comprise input and output electrodes communicating with the speed detector wherein the transmission control unit communicates with the speed detector through the output electrode.

DETAILED DESCRIPTION OF THE EMBODIMENT

An exemplary embodiment of the present invention will hereinafter be described in detail with reference to the accompanying drawings.

Figure 1:
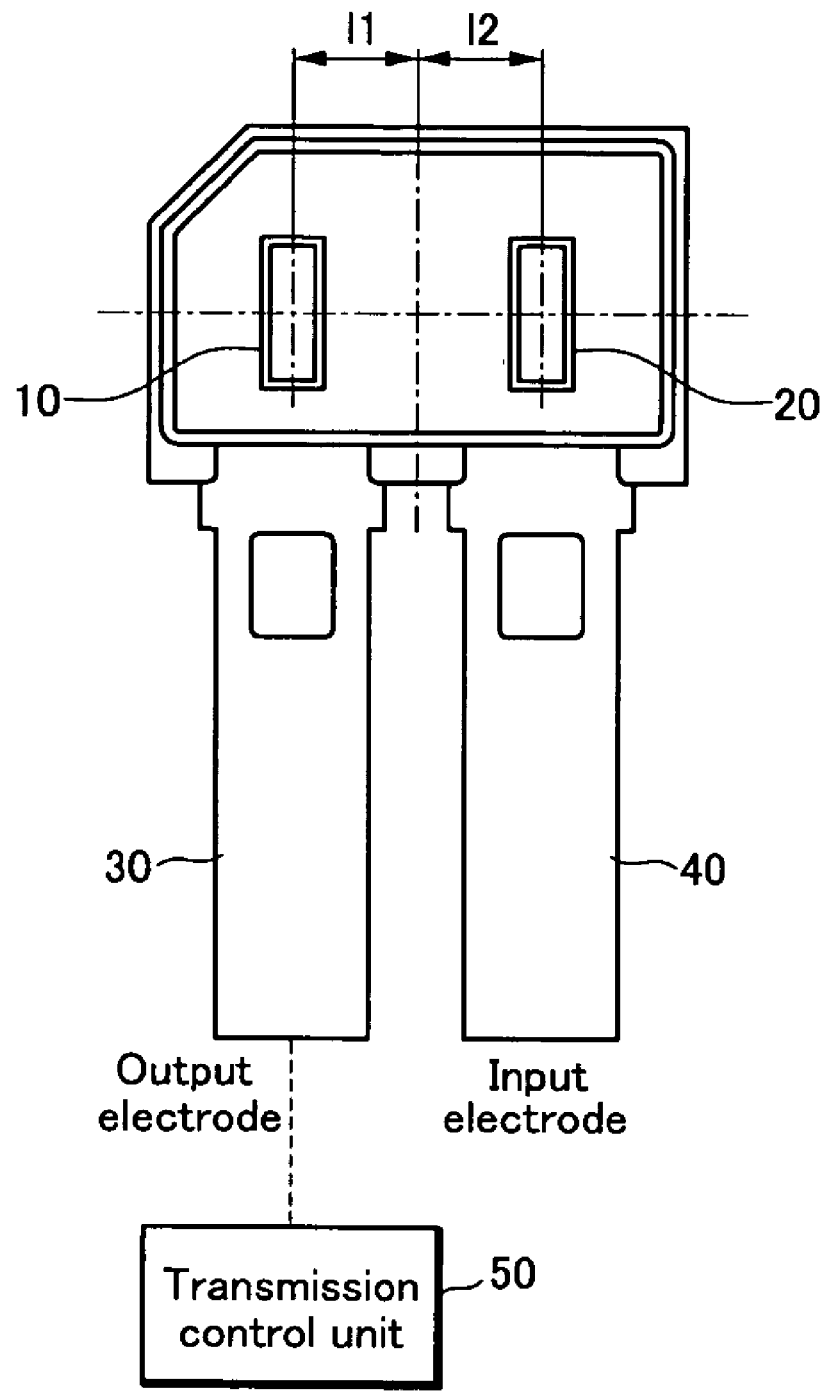
FIG. 1 is a schematic diagram of a system that performs a method for detecting forward/reverse speeds of a continuously variable transmission for vehicles according to an exemplary embodiment of the present invention.

As shown in FIG. 1, a system that performs a method for detecting forward/reverse speeds of a continuously variable transmission for vehicles according to an exemplary embodiment of the present invention includes a speed detector 60 and a transmission control unit 50.

In one embodiment, the speed detector 60 includes two Hall sensors 10 and 20. The speed detector 60 detects first and second rotational speeds of an output shaft by using the first and second Hall sensors 10 and 20, and transmits a signal corresponding thereto to the transmission control unit 50.

The first and second Hall sensors 10 and 20 detect the first and second rotational speeds of the output shaft by using the Hall Effect. The first and second Hall sensors 10 and 20 are disposed left and right of a center of the speed detector 60 and are located apart from the center of the speed detector 60 by predetermined lengths L1 and L2, respectively. In addition, the first and second Hall sensors 10 and 20 are disposed in parallel with each other.

The predetermined lengths L1 and L2 are easily obtained by a person of an ordinary skill in the art based on the teachings of the present invention as set forth herein. Particularly, the predetermined lengths L1 and L2 may be designed such that in a case that the first and second rotational speeds of the output shaft are modulated into a pulse width modulation signal, a pulse width of the pulse width modulation signal can be a predetermined pulse width according to a moving direction of a vehicle. According to an exemplary embodiment of the present invention, the predetermined lengths L1 and L2 are 2.67 cm and 2.5 cm, respectively. The predetermined lengths L1 and L2 are designed such that a first pulse width, which is twice as wide as a basic pulse width, is output in the reverse speed state and a second pulse width, which is four times as wide as the basic pulse width, is output in the forward speed state.

In addition, the speed detector 60 includes an input electrode 40 for receiving an electric power and an output electrode 30 connected to the transmission control unit 50.

Therefore, the speed detector 60 transmits the first and second rotational speeds of the output shaft detected by the first and second Hall sensors 10 and 20 to the transmission control unit 50.

The transmission control unit 50 can be realized by one or more processors activated by a predetermined program stored in a memory. The predetermined program can be programmed by a person of ordinary skill in the art to perform each step of a method for detecting forward/reverse speeds of a continuously variable transmission for vehicles based on the teachings of embodiments of this invention as set forth herein.

The transmission control unit 50 receives the first and second rotational speeds of the output shaft from the speed detector 60 and modulates the first and second rotational speeds of the output shaft into the pulse width modulation signal.

In addition, the transmission control unit 50 compares the pulse width of the pulse width modulation signal with predetermined values and determines whether the vehicle is in the forward speed state or in the reverse speed state.

Figure 2:
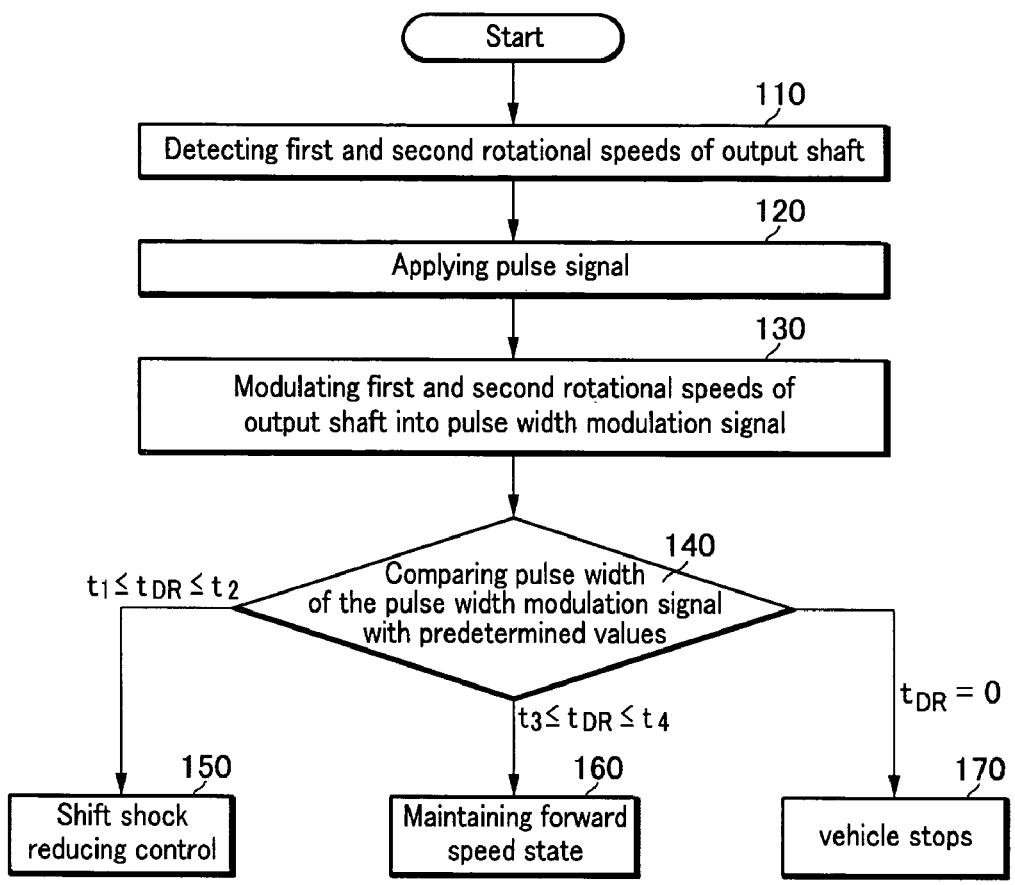
FIG. 2 is a flowchart of a method for detecting forward/reverse speeds of a continuously variable transmission for vehicles according to an exemplary embodiment of the present invention.
Figure 3:
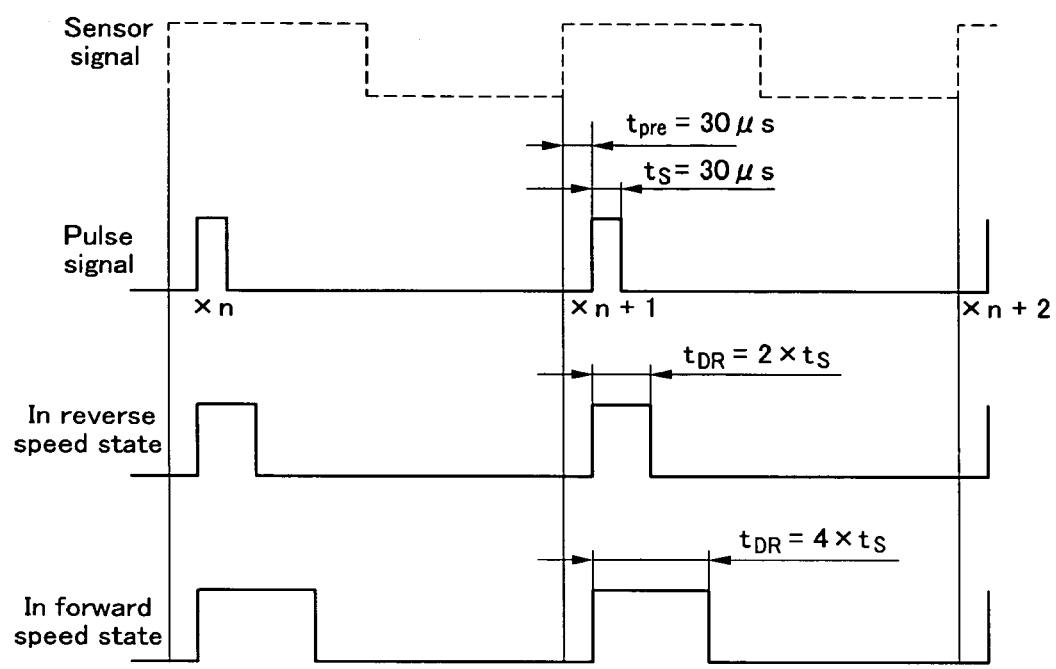
FIG. 3 is a timing graph showing a pulse width modulation signal of forward and reverse speed states.

Hereinafter, referring to FIG. 2 and FIG. 3, an exemplary method for detecting forward/reverse speeds of a continuously variable transmission according to an embodiment of the present invention will be described in detail.

When the vehicle starts moving, the speed detector 60 detects the first and second rotational speeds of the output shaft by using the first and second Hall sensors 10 and 20 at step S100, and transmits the signal corresponding thereto to the transmission control unit 50.

After that, a predetermined pulse signal is applied to the transmission control unit 50 at step S120. As shown in FIG. 3, a sensor signal applied from the speed detector 60 is a rectangular wave, and the pulse signal has a predetermined delay time $t_{pre}$ and a predetermined pulse width $t_s$.

After that, the transmission control unit 50 modulates the first and second rotational speeds of the output shaft into the pulse width modulation signal at step S130. The signal modulation is performed by executing a predetermined program, and the predetermined program is well known to a person of an ordinary skill in the art.

After that, the transmission control unit 50 compares the pulse width $t_{DR}$ of the pulse width modulation signal with the predetermined values at step S140.

As described above, the first and second Hall sensors are disposed left and right of the center of the speed detector 60 and are located apart from the center of the speed detector by the predetermined lengths L1 and L2, respectively. In addition, the predetermined lengths L1 and L2 are 2.67 cm and 2.5 cm, respectively. Therefore, the pulse width $t_{DR}$ is twice as wide as the pulse width $t_s$ of the pulse signal in a state that the vehicle is in the reverse speed state, and the pulse width $t_{DR}$ is four times as wide as the pulse width $t_s$ of the pulse signal in a state that the vehicle is in the forward speed state.

However, considering an error, the transmission control unit 50 determines that the vehicle is in the reverse speed state when the pulse width $t_{DR}$ is larger than or equal to a first predetermined value $t_1$ and is smaller than or equal to a second predetermined value $t_2$, and controls the transmission so as to reduce shift shock at step S150.

In addition, the transmission control unit 50 determines that the vehicle is in the forward speed state when the pulse width $t_{DR}$ is larger than or equal to a third predetermined value $t_3$ and is smaller than or equal to a fourth predetermined value $t_4$, and controls the transmission so as to maintain the forward speed state at step S160.

In addition, when the pulse width $t_{DR}$ is 0, the transmission control unit 50 determines that the vehicle is stopped at step S170.

Lastly, when the pulse width $t_{DR}$ is smaller than the first predetermined value $t_1$, the pulse width $t_{DR}$ is larger than the second predetermined value $t_2$ and is smaller than the third predetermined value $t_3$, or the pulse width $t_{DR}$ is larger than the fourth predetermined value $t_4$, the transmission control unit 50 generates a malfunction code.

The present invention may reduce production cost and size of the transmission by mounting two sensors in one speed detector and determining whether a vehicle is in a forward speed state or in a reverse speed state by using the one speed detector.

In addition, since the transmission is controlled according to a moving direction of a vehicle, the present invention may reduce shift shock.

While this invention has been described in connection with what is presently considered to be a practical exemplary embodiment, it is to be understood that the invention is not limited to the disclosed embodiment, but, on the contrary, is intended to cover various modifications and equivalent arrangements included within the spirit and scope of the appended claims.

What is claimed is:

1. A method for detecting forward/reverse speeds in a continuously variable transmission, comprising:

detecting first and second rotational speeds of an output shaft of the continuously variable transmission;

modulating the first and second rotational speeds of the output shaft into a pulse width modulation signal;

comparing a pulse width of the pulse width modulation signal with predetermined values, wherein the predetermined values include a first predetermined value, a second predetermined value, a third predetermined value and a fourth predetermined value; and determining whether a vehicle is in a forward speed state or in a reverse speed state based on a result of said comparing;

wherein the vehicle is determined to be in the reverse speed state when the pulse width is larger than or equal to the first predetermined value and is smaller than or equal to the second predetermined value, and wherein the vehicle is determined to be in the forward speed state when the pulse width is larger than or equal to the third predetermined value and is smaller than or equal to the fourth predetermined value.

2. The method of claim 1, wherein a malfunction code is generated when the pulse width is smaller than the first predetermined value, the pulse width is larger than the second predetermined value and is smaller than the third predetermined value, or the pulse width is larger than the fourth predetermined value.

3. A system for detecting forward/reverse speeds in a continuously variable transmission, comprising:

a speed detector including two sensors, each sensor being spaced from a speed detector centerline by a predetermined distance, wherein said predetermined distances are related based on a speed detection algorithm; and wherein a transmission control unit includes a memory containing a program for execution by a processor, said program comprising the steps of:

detecting first and second rotational speeds of an output shaft of the continuously variable transmission by the respective sensor of the two sensors;

modulating the first and second rotational speeds of the output shaft into a pulse width modulation signal;

comparing a pulse width of the pulse width modulation signal with predetermined values, wherein the predetermined values include a first predetermined value, a second predetermined value, a third predetermined value and a fourth predetermined value; and determining whether a vehicle is in a forward speed state or in a reverse speed state based on a result of said comparing, wherein the vehicle is determined to be in the reverse speed state when the pulse width is larger than or equal to the first predetermined value and is smaller than or equal to the second predetermined value, and wherein the vehicle is determined to be in the forward speed state when the pulse width is larger than or equal to the third predetermined value and is smaller than or equal to the fourth predetermined value.

4. The system of claim 3, wherein said sensors are Hall sensors.

5. The system of claim 3, wherein the transmission control unit communicates with said speed detector and includes the processor programmed for comparing speed signals from the two sensors to determine the forward or reverse speed state.

6. The system of claim 5, further comprising input and output electrodes communicating with the speed detector and said transmission control unit communicates with the speed detector through said output electrode.

7. The system of claim 5, wherein said system includes only one said speed detector.

* * * * *